C. E. MIDDLETON.
TRACTION WHEEL.
APPLICATION FILED FEB. 7, 1918.
1,312,740.
Patented Aug. 12, 1919.
2 SHEETS—SHEET 1.
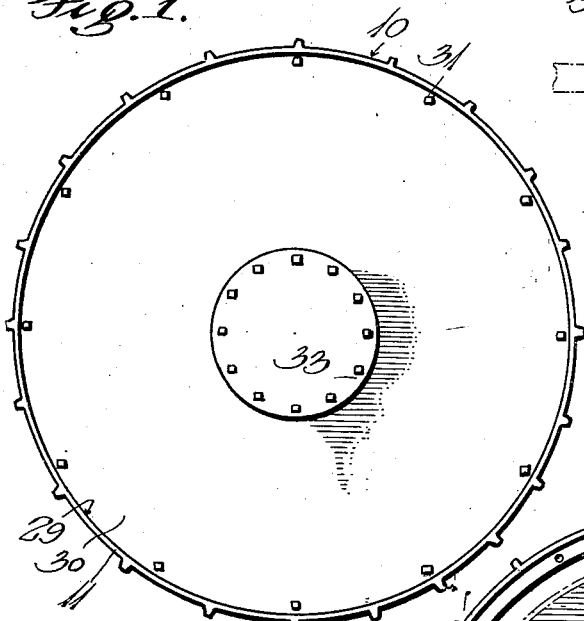
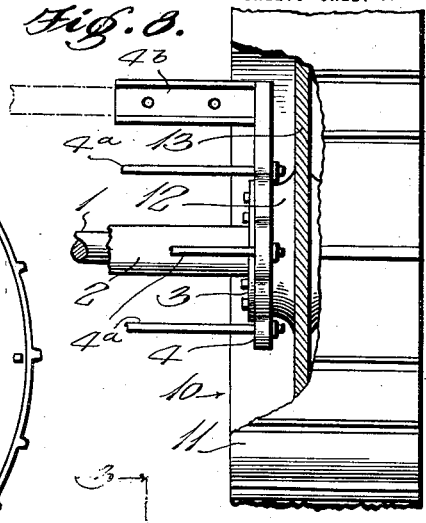
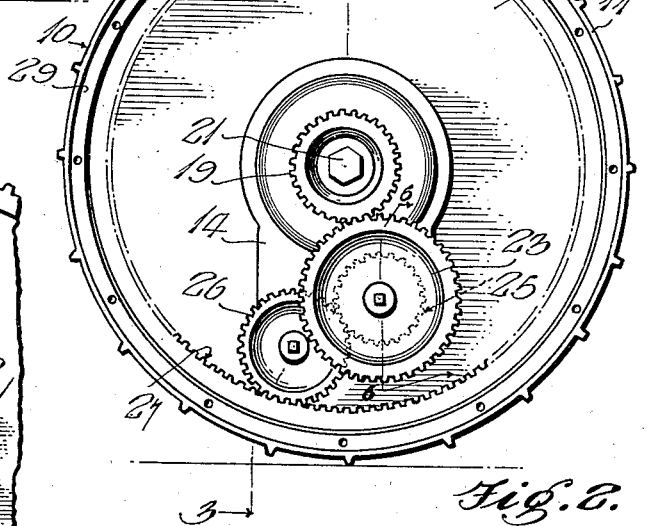
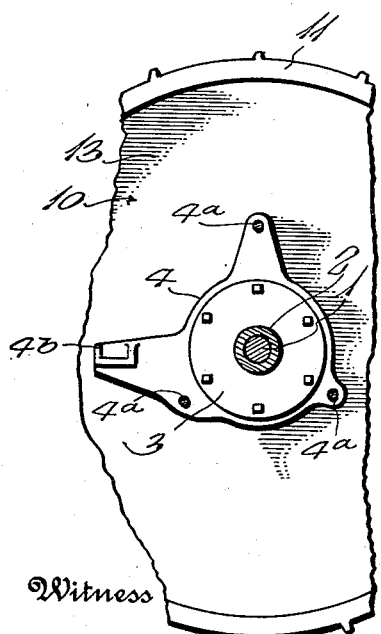
Witness
H. Woodard
Inventor
C. E. Middleton
By H. B. Wilson & Co.
Attorneys

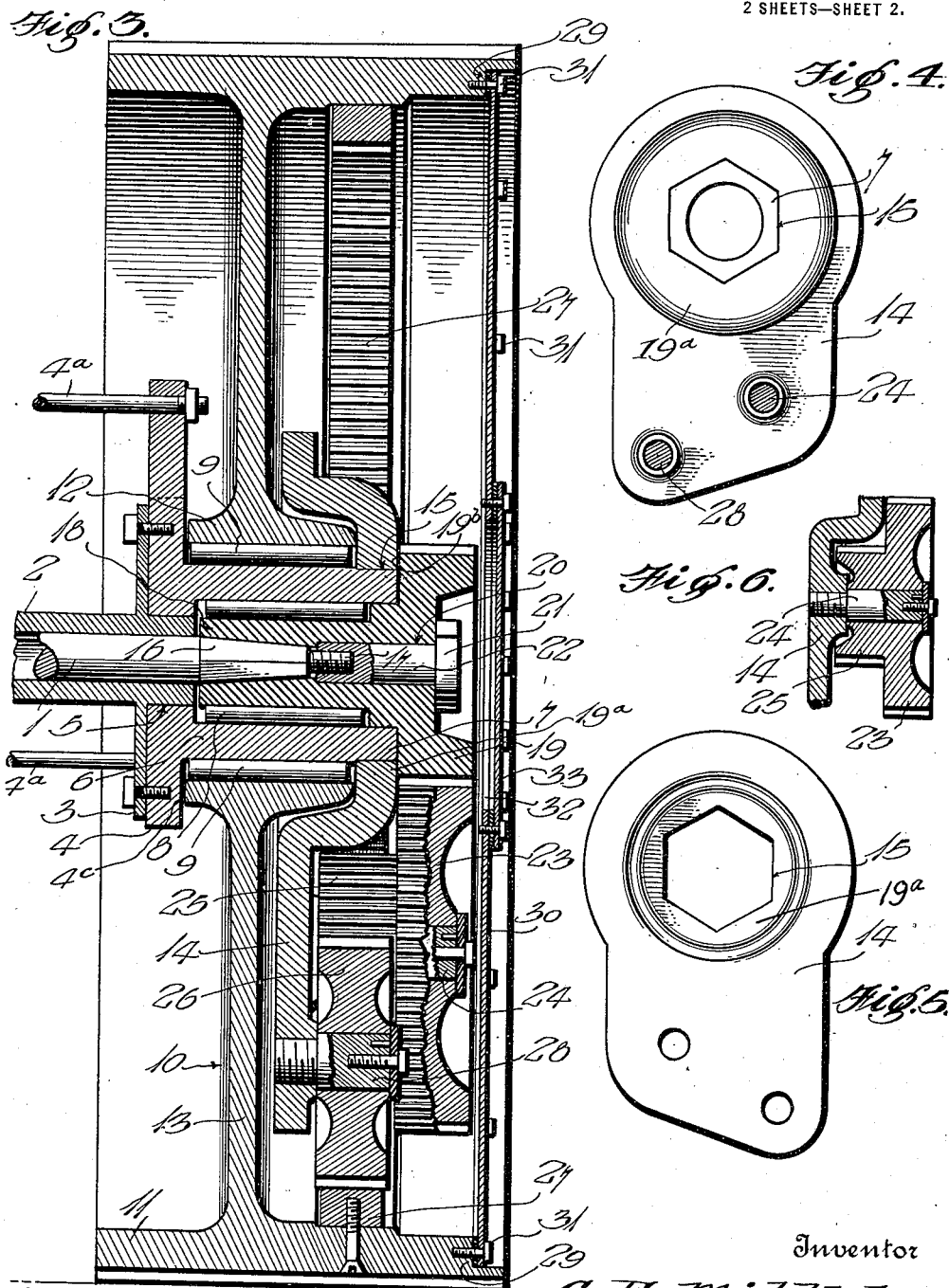

UNITED STATES PATENT OFFICE.

CLAUDE ELMORE MIDDLETON, OF EAGLE GROVE, IOWA.

TRACTION-WHEEL.

1,312,740.   Specification of Letters Patent.   Patented Aug. 12, 1919.

Application filed February 7, 1918. Serial No. 215,795.

*To all whom it may concern:*

Be it known that I, CLAUDE E. MIDDLETON, a citizen of the United States, residing at Eagle Grove, in the county of Wright and State of Iowa, have invented certain new and useful Improvements in Traction-Wheels; and I do declare the following to be a full, clear, and exact description of the invention, such as will enable others skilled in the art to which it appertains to make and use the same.

This invention relates to traction wheels and gearings for vehicles, and especially for traction engines.

One of the objects of the invention is to provide an extremely simple, strong, durable, efficient and comparatively inexpensive traction wheel that is applicable for use on practically all traction engines of known construction.

An additional object is to provide a device of this character in which the reducing gears and other operating parts are inclosed within an oil-tight casing formed partially by the web and rim of the ground wheel.

Still another object is to provide a traction wheel having an improved means for supporting the train of reducing gears within the above mentioned casing.

With these and several other objects in view, the invention resides in the novel features of construction, combination and arrangement of parts which will be hereinafter more particularly set forth in the specification and claims.

In the accompanying drawings:

Figure 1 is a side elevation showing the outer side of a traction wheel constructed in accordance with my invention;

Fig. 2 is a similar view with the cover plates removed;

Fig. 3 is a vertical transverse section taken substantially on the plane of the line 3—3 of Fig. 2;

Figs. 4 and 5 are detail side elevations of the gear train supporting plate;

Fig. 6 is a detail vertical section on the line 6—6 of Fig. 2;

Fig. 7 is a fragmentary sectional view looking toward the inside of the wheel;

Fig. 8 is a plan view partly in section of a portion of one of the wheels and its connection with the axle casing.

The structure shown in the accompanying drawings may be disposed upon either the front or rear axle of the vehicle, or both, depending upon which is connected to the engine or other operating means. As usual in vehicles such as traction engines, the rotating axle 1 is inclosed in a stationary casing 2, the latter being fixed to the body or frame of the vehicle in any preferred manner. In the present instance, the casing 2 terminates at a point spaced from the ends of the axle where it is provided with the radial flanges 3, one of the latter being formed at each end of the casing. In the accompanying drawings, since all the ground wheels and the adjacent operating parts therefor are constructed substantially alike, only one ground wheel and one end of the axle carrying the same will be illustrated in detail.

To the annular flange 3 is secured an annular plate 4 or a plate of any other suitable configuration, said plate having a central opening 5 through which the axle 1 extends. The plate 4 is apertured for the reception of bolts 4ª by which it may be secured to the main body (not shown) of the traction engine. A draft bar, indicated in broken lines in Fig. 8, may be secured to the plate 4 through the medium of a bracket 4ᵇ on each plate 4. The outer face of the plate 4 has a sleeve 6 formed integrally therewith, said sleeve being disposed around and spaced from the outer end of the axle 1, the end of said axle being spaced inwardly a slight distance from the free end of the sleeve as shown. With the exception of the outer surface of the free end of the sleeve 6, which is preferably hexagonal as shown at 7, the sleeve is annular in cross section, the inner and outer surfaces forming bearing surfaces for roller bearings 8 and 9, the purpose of which will later be set forth.

The ground wheel 10 comprises a relatively wide rim 11, a relatively wide hub 12, and a solid or imperforate web 13 which connects the rim and hub and is preferably formed integrally therewith. It will be noted from Fig. 3 that the web 13, which takes the places of the usual spokes, is connected to the rim 11 at a point nearer the inner edge than the outer, thereby providing a rather wide space between the outer edge of the rim and the web 13 in which the reducing gears are adapted to be disposed as will later appear. The opening in the hub 12 is somewhat larger than the diameter of the sleeve 6 in order that the roller or other type of bearings 9 may be disposed between the contiguous faces of the hub and sleeve. These bearings serve the usual purpose of permitting the wheel to rotate more freely upon the extension of the casing 2 which in effect produces a supplemental yet non-rotatable axle.

The inward movement of the ground wheel on the sleeve 6 is limited by the engagement of the inner end of the hub with the plate 4, the wheel being held in position on said sleeve by a gear train supporting plate 14 which is fixed against rotation on the outer end of the sleeve 6. As hereinbefore mentioned, the outer end of this sleeve is preferably hexagonal in cross section as shown at 7, this portion being disposed in a similarly shaped opening 15 in the plate 14. This plate 14 is substantially rectangular, the opening 15 therein being adjacent the upper portion, this portion also having a circular depressed portion $19^a$ which surrounds said opening and receives the outer end of the hub 12 of the ground wheel when the parts are in operative position. In other words, the recess or depressed part of the plate engages the ends of the bearings 9 and the hub and is secured to the sleeve 6, while the main portion of the plate is positioned in close proximity to the web 13 of the ground wheel.

From the foregoing it may be seen that the elements 2, 3, 4, 6, 7 and 14 combine to form a rigid and relatively fixed frame or supporting structure in and on which the moving parts of the device are secured, as will hereinafter become more obvious. Also, the elements 2, 3, 4, 6 and 7 may be considered as a relatively fixed and unitary supporting structure on which the separate supporting member 14 is removably secured.

The free end portion of the axle 1 is tapered outwardly as shown at 16, and the extreme end is reduced and threaded as at 17, this portion of the axle being disposed in the elongated cylindrical hub 18 which is formed integrally or otherwise secured to one face of a pinion 19. The outer diameter of the hub 18 is slightly less than the inner diameter of the sleeve 6 so that the roller bearings 8 are disposed therebetween. The inward portion of the bore of the hub 18 is tapered outwardly to receive the tapered portion 16 of the axle 1, and the outer end of the bore communicates with a central opening 20 in the pinion 19. A lock nut 21, having a shank 22 extended into the opening 20 and the bore of the hub 18, connects the pinion 19 to the axle 1, the inner end of said shank 22 having a threaded socket to receive the reduced and threaded end 17 of the axle. The enlarged or outer end of the lock nut 21 engages the outer face of the pinion 19, and by this arrangement, the latter is effectively secured to the axle and caused to rotate therewith.

The teeth of the pinion 19 are normally in mesh with the teeth of a second pinion 23 which is rotatably mounted on a stub shaft 24, the latter being carried by the plate 14. This pinion 23 has a pinion 25, of smaller diameter, secured to its inner face, which meshes with a fourth pinion 26 which in turn engages the teeth of a gear ring or internal gear 27 secured to the inner surface of the rim 11 adjacent the web 13 and between the outer face thereof and the outer edge of the rim. The pinion 26 is rotatably mounted on a stub shaft 28 carried by the plate 14. By means of this train of gears, the high speed transmitted by the axle 1 is reduced during its transmission to the wheel 10. By disposing the internal gear 27 adjacent the web 13, a much stronger structure is produced, and to accommodate this arrangement, the plate 14 is depressed to allow its main portion to be positioned adjacent the web 13. Furthermore, by mounting the gears in this manner and upon such a supporting plate, a very compact gearing is formed, in which practically all of the operating parts are inclosed in a dust-proof and oil-tight casing. From Fig. 3 it will be seen that the outer faces of the outermost gears are within the outer edge of the rim 11, said outer edge being shouldered as shown at 29. By thus shouldering the outer edge of the rim, the circular plate 30 may be inset in said rim to inclose the gears and the adjacent parts. At suitable intervals, around the edge of the plate are disposed the screws 31 which secure the plate to the rim. In the center of this plate 30, the circular opening 32 is formed to provide a hand hole by which access may be gained to the interior of the casing and to the pinion 19, this opening being closed by a cover plate 33 held in position by any suitable or preferred means. The casing thus formed may be made fluid-tight by disposing a suitable washer between the end of the rim and the plate 30 and prevent any oil which may be placed therein from leaking out. If desired, a sufficient amount of oil may be placed in the casing to cover most of the pinions which form the connection between the rim and the pinion 19.

From the foregoing it is obvious that the inner surface $19^b$, of the pinion 19, and the outer surface $4^c$, of the member 4, constitute abutments that coöperate with the elements 1 and 21 for preventing axial movement of the members 13 and 14 with relation to one another and with relation to the axle 1.

The operation of this invention is very obvious from the accompanying drawings, wherein it will be seen that upon rotation of the axle 1 by any preferred means, this rotary movement will be transmitted to the hub of pinion 19, said hub being rotatable within the stationary sleeve 6; the movement of this pinion will cause the pinions 23 and 25 to rotate, the latter moving the pinion 26. Even though the axle 1 is revolving at a high rate of speed, the gear ring 27 which is in mesh with the pinion 26 will be turned rather slowly, thus increasing greatly the traction power of the ground wheel.

Having thus described my invention, what I claim as new is:—

1. In combination, a vehicle axle, a casing surrounding the same, the end of the axle extending beyond the end of the casing, a sleeve secured to and projecting from the end of the casing around the end of said axle and spaced from the latter, a wheel having its hub surrounding and rotatable on said sleeve, a stationary gear train supporting arm fixed to said sleeve, a pinion having an elongated cylindrical hub formed thereon, said pinion having a central opening communicating with the bore of its hub, said hub surrounding the end of the axle and being disposed within said sleeve, a nut extending into the opening in said pinion to secure the latter to the axle, a gear ring on the wheel, and a train of gears connecting the pinion and the gear ring and mounted on said gear train supporting arm.

2. In combination, a vehicle axle, a casing inclosing the same, the end of the axle extending beyond the end of the casing, a plate secured to the end of the casing, a sleeve formed integrally with said plate and surrounding the end of the axle, the outer surface of the free end of said sleeve being angular, a wheel having a relatively wide hub surrounding said sleeve, its inner end engaging said plate, a stationary gear train supporting plate having an angular opening to receive the angular end of the sleeve, said plate having a circular depression surrounding said opening to receive the outer end of the wheel hub, the outer portion of the plate thereby being disposed adjacent the web of said wheel, a pinion secured to the end of the axle, a gear ring on the rim of the wheel adjacent the web thereof, and a train of gears carried by the last named plate and connecting the pinion and the gear ring.

3. The combination of a supporting structure comprising a hollow cylindrical member having inner and outer bearing surfaces, a wheel mounted to be rotatable around the outer bearing surface of said cylindrical member, a transmission member comprising a cylindrical element rotatable within said hollow cylindrical member, a supporting member non-rotatably and removably secured on said hollow cylindrical member, a speed-changing train of gears supported by and removable with said supporting member and operatively connecting with said transmission member, a transmission member fixed to said wheel and connected to a gear of said train, and a shaft removably secured to the first said transmission member, substantially as specified.

4. In a traction device, a bearing member having inner and outer bearing surfaces and an abutment at one end of each of these bearing surfaces, a wheel mounted to rotate around the outer one of said bearing surfaces, a supporting member removably secured on said bearing member, a transmission member connected to said wheel, transmission means carried by and removable with said supporting member and coöperative with the said transmission member for rotating said wheel, a transmission member provided with a bearing element and with an abutment and being operatively connected to said transmission means, a rotary axle immovable in its axial direction with relation to said bearing member, and means for securing the last said transmission member to said axle in such position that the first and last said abutments coöperate to secure said supporting member and said wheel against movement in the axial direction of the latter with relation to said shaft.

In testimony whereof I have hereunto set my hand in the presence of two subscribing witnesses.

CLAUDE ELMORE MIDDLETON.

Witnesses:
GEORGE H. VIVIAN,
BESSIE G. DERSCHIED.